United States Patent Office 3,476,753
Patented Nov. 4, 1969

3,476,753
TERTIARYAMINO PERFLUORO ALKYLENE SULFONIC ACID FLUORIDES
Robert L. Hansen, Roseville, Minn., assignor to Minnesota Mining and Manufacturing Company, St. Paul, Minn., a corporation of Delaware
No Drawing. Filed May 3, 1965, Ser. No. 452,859
Int. Cl. C07d 87/30, 51/72; C07c 143/14
U.S. Cl. 260—247.1                                     6 Claims

ABSTRACT OF THE DISCLOSURE

Tertiary amino sulfonic acid halides are provided which are subjected to electrofluorination to provide tertiary amino perfluoroalkylene sulfonic acid fluorides.

---

This invention relates to an improved process for electrofluorinating certain sulfonic acid halides, to the resulting acid halides and certain derivatives thereof as new compounds, and to the new sulfonic acid halides starting compounds used in such process.

In one aspect, the invention relates to tertiary amino alkylene sulfonic acid halides and to methods for making the same.

In another aspect, the invention relates to the method of electrofluorinating such tertiary amino sulfonic acid halides in a current-conducting electrolyte solution of anhydrous liquid hydrogen fluoride in a cell containing an electrode pack.

In still another aspect, the invention relates to tertiary aminoperfluoralkylenesulfonic acid fluorides and derivatives thereof.

The sulfonic acid halide starting compounds used in this invention provide unexpected improvement in the electrofluorination process over conventional hydrocarbon sulfonyl halides as starting compounds. The compounds used in this invention are more readily soluble in the hydrogen fluoride reaction medium, and the resulting solutions show improved conductivity, compared to the conventional hydrocarbon sulfonyl halide starting compounds of comparable molecular weight; such improvements apparently are associated with the ability of the starting compounds to form the corresponding hydrofluoride salts. As a result, the electrochemical cell applied voltage for electrofluorination is generally less than that required for hydrocarbon sulfonyl halides. Also, less tarring is observed in the cell during electrofluorination, especially with compounds of 10 carbon atoms or more.

The general electrochemical process utilized in the present invention is disclosed in Simons U.S. Patent No. 2,519,983; Scholberg et al. U.S. Patent No. 2,717,871; Brice et al. U.S. Patent No. 2,732,398; and pages 417–18 of the book entitled Fluorine Chemistry, volume I edited by J. H. Simons, published by Academic Press, Inc., 1950. This process utilizes an electrode pack comprising alternating and closely-spaced iron cathode plates and nickel anode plates. Although the theoretical voltage required to obtain fluorine from anhydrous hydrogen fluoride is given in the literature to be 2.77 volts, the processes of this invention are carried out at voltages typically in the range from about 4 to 8 volts direct current, though higher voltages can be employed. The direct current employed can conveniently be in the range of from about 5 to 35 amperes, though those skilled in the art will appreciate that the amperage can be as high as 40,000 amperes or higher in large scale commercial electrolytic cells; the amperage used in any given cell is a function of the size of the cell. A cell can be operated substantially at atmospheric pressures using temperatures ranging from about 0° C. to about 40° C. or at higher temperatures and pressures as those skilled in the art will appreciate.

An object of this invention is to provide a new class of fluorinated sulfonic acid fluorides.

Another object of this invention is to provide a class of compounds as above described which are nitrogen substituted in the alpha, beta, gamma or delta positions.

Another object of this invention is to provide derivatives of the above-described class of compounds.

Another object of this invention is to provide a class of compounds having surfactant and other utility made by electro-fluorinating alpha, beta, gamma or delta substituted sulfonic acid halides.

Another object of the present invention is to provide an improvement in the electrochemical process for the production of perfluorinated sulfonic acid fluorides.

Another object of the present invention is to provide new sulfonic acid halide starting compounds for use in the electro-chemical process, which compounds are substituted by nitrogen in the alpha, beta, gamma or delta positions.

Various other objects and advantages of the present invention will become apparent to those skilled in the art from the accompanying description and disclosure.

The present invention resides in the use of sulfonic acid halides substituted by nitrogen in the alpha, beta, gamma or delta positions, preferably, and having only methylene groups between the acid radical and the nitrogen atom as starting compounds for introduction into the electrochemical cell as described above. A preferred class of starting compounds for use in the present invention are nitrogen substituted sulfonic acid halides of the formula:

(1) 

where: X is halogen; $n$ is an integer from 1 through 4; Q′ can be alkyl radicals of less than 9 carbon atoms, cycloalkyl radicals of less than 9 carbon atoms, lower alkylcycloalkyl radicals of less than 9 carbon atoms, a phenyl radical, alkaryl radicals of less than 9 carbon atoms, aralkyl radicals of less than 9 carbon atoms, and alkylenesulfonyl halide radicals of less than 5 carbon atoms, and an ethylene carbonyl halide radical; Q″ can be alkyl radicals of less than 19 carbon atoms, cycloalkyl radicals of less than 9 carbon atoms, lower alkylcycloalkyl radicals of less than 9 carbon atoms, a phenyl radical, alkaryl radicals of less than 9 carbon atoms, aralkyl radicals of less than 9 carbon atoms, and alkylene-sulfonyl halide radicals of less than 5 carbon atoms; and Q′ and Q″ taken together can be an alkylene diradical whose chain portion is formed by at least 4 and less than 7 carbon atoms, an alkylene oxide diradical whose chain portion is formed by at least 4 and less than 6 carbon atoms, an alkylene sulfide diradical whose chain portion is formed by at least 4 and less than 6 carbon atoms, an alkylene sulfone diradical whose chain portion is formed by at least 4 and less than 6 carbon atoms, and diethylene gamma amino propionyl halide diradical.

In the foregoing definitions of Formula 1 it will be appreciated that when Q′ and Q″ are taken together, they form the indicated various types of heterocyclic diradicals all of which contain the nitrogen atom of Formula 1 as one member of the ring. The alkylene portions of these heterocyclic ring structures can contain one or two alkyl branches substituted on ring carbon atoms; such alkyl branches contain one or two carbon atoms each.

A more preferred class of starting compounds consists of those compounds of Formula 1 where X is chlorine; Q' and Q" are each a lower alkyl radical (i.e. one containing less than 5 carbon atoms); and Q' and Q" together with the nitrogen atom shown in Formula 1 between them form a morpholine or a piperazine ring structure, and $n$ is 3.

When $n$ is 3 or 4, compounds of Formula 1 can be prepared from the corresponding secondary amine and a suitable 1,3-propanesultone, or 1,4-butanesultone by the following route:

(2)

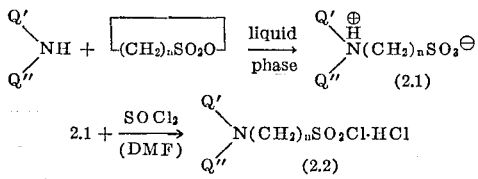

where $n$ is the integer 3 or 4 and Q' and Q" have their above given definitions.

The sultone and the secondary amine of Equation 2 are preferably contacted under liquid phase conditions. A convenient and preferred procedure involves first dissolving the sultone in a relatively large volume of solvent, the solvent being so-chosen as to be essentially non-reactive (i.e. inert) towards the reactants. Conveniently, the solution contains 5 to 30 weight percent solids. Suitable conventional solvents selected from ethers, hydrocarbons, alcohols and ketones can be employed as those skilled in the art will appreciate. One convenient solvent is acetone.

Next it is convenient to add dropwise with stirring the secondary amine. The reaction which results occurs rapidly and exothermically. To maximize yields, it is preferred to keep the reaction mass below about 50° C. The total amount of secondary amine added is preferably so chosen as to be a molar equivalent of the amount of sultone in solution. After secondary amine addition is complete, the reaction mixture is stirred or otherwise agitated until the reactants are completely consumed as demonstrated by the appearance of crystals in the reaction medium. These crystals can be separated conveniently by filtering after which they can be conveniently washed as with fresh acetone and then dried, preferably under reduced pressure, to yield the corresponding N-gamma or delta substituted alkylene sulfonic acid.

The corresponding sulfonyl chloride compounds (Formula 2.2) are prepared by treating Formula 2.1 compounds with $SOCl_2$, either as a suspension in an aromatic hydrocarbon, such as benzene or toluene, or using $SOCl_2$ in large excess as the suspending agent. Dimethylformamide (DMF) is added in 0.5 to 2 mole percent to catalyze the reaction which is run under reflux conditions typically from 75 to 120° C. The end of the reaction is conveniently indicated by the cessation of $SO_2$ evolution. A product sulfonyl chloride compound is isolated as its hydrochloride salt is essentially pure form, and can be directly charged to the electrochemical cell. Yields are typically 60 to 90 percent of theory.

When $n$ is 2 in Formula 1 above, the sulfonyl halides can be conveniently prepared by either of two routes, as illustrated by the following equations:

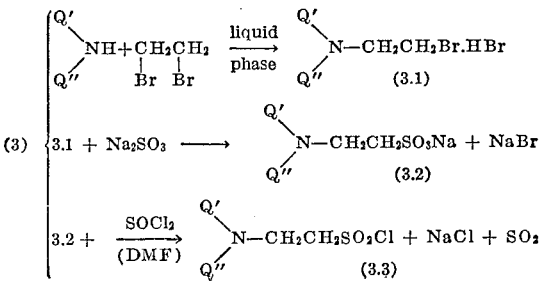

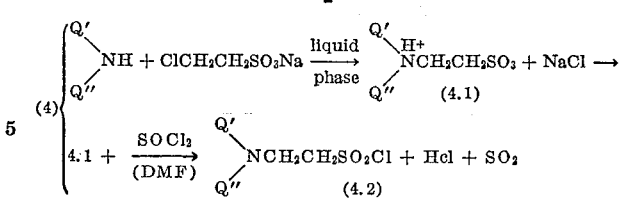

In Equations 3 and 4 Q' and Q" have their above indicated definitions.

The route of Equation 3 utilizes an N,N-disubstituted betaaminoethylene halide hydrohalide (see Formula 3.1). These compounds are prepared by reacting the appropriate amine with a large excess of ethylene dichloride or (preferably) ethylene dibromide in an autoclave at temperatures of 100°–150° C. for several hours in an appropriate non-reactive solvent, such as an aromatic hydrocarbon, e.g. benzene or toluene, or an ether, e.g. ethylene glycol dimethyl ether or dioxane. Alternatively, a large excess of the appropriate dihalide is the solvent. The solvent is preferably so chosen that in it the two reactants are soluble, while the product is insoluble as the hydrohalide salt and thus may be isolated therefrom by filtration.

The N,N-disubstituted betaaminoethylene halide of Formula 3.1 can also be prepared from the appropriate N,N-disubstituted betaaminoethanol using $SOCl_2$ or $SOBr_2$. For example, the corresponding aminoalcohol hydrohalide is charged to a stirred reaction vessel, and about 10 parts of an inert aromatic hydrocarbon such as benzene or toluene is added to make a slurry. The $SOCl_2$ or $SOBr_2$ in slight molar excess is added, and the mixture is brought to reflux over a period of 1 to 2 hours. The completion of reaction is signified by the end of gas evolution. The product is isolated by filtration.

The N,N-disubstituted taurines of Formula 3.2 are easily prepared by reacting a N,N-disubstituted betaaminoethylenehalide of Formula 2.1 with a large excess of sodium sulfite in water solution. The amine is charged as its hydrohalride for example, to a 20 weight percent aqueous solution of $Na_2SO_3$ to make a five to ten fold excess of such $Na_2SO_3$ solution, and then this resulting solution, after being heated to boiling, is concentrated to half its volume over about 4 to 10 hours. Upon cooling, the taurine separates as crystals. It may be recrystalized from water to purify.

The sulfonyl chlorides of Formulas 3.3 and 4.2 are prepared in the same manner as above described for the sulfonyl chlorides of Formula 2.2. Yields commonly are 50 to 80 percent of theory.

The route of Equation 4 to the N,N-disubstituted taurines proceeds by alkylation of the appropriate amine with sodium betachloroethanesulfonate in a suitable solvent such that the product is soluble while hot to facilitate removal of the by-product NaCl. Lower alcohols, such as methanol and ethanol; ketones, such as acetone and methyl ethyl ketone; and amides, such as dimethyl formamide and dimethyl acetamide, are useful solvents. The reaction is conveniently run at 55–120° C., using total solids concentrations of 5 to 25 percent of the reactants.

The N,N-disubstituted taurine is converted to the sulfonyl chloride or the sulfonyl bromide by employing preferably $SOCl_2$ or $SOBr_2$ as appropriate, with 0.5 to 2 mole percent of DMF as catalyst. The $SOCl_2$ or $SOBr_2$ may be used as a suspending medium, or aromatic hydrocarbons such as benzene or toluene may be employed, and the $SOCl_2$ or $SOBr_2$ used in essentially equimolar ratios to the substituted taurine.

The sulfonyl fluorides described in this invention are best prepared by the action of $SF_4$ with the appropriate sulfobetaine following the teachings of W. R. Hasep et al., Journal of American Chemical Society 82 543 (1960).

The appropriate N,N-disubstituted alkylene sulfonic acid is dissolved in anhydrous hydrogen fluoride and treated with an equivalent of $SF_4$ in a pressure vessel. The solution of the aminosulfonyl fluoride is then used for fluorination.

When $n$ is 1 in Formula 1 above, the sulfonyl halides can be prepared according to the following reaction:

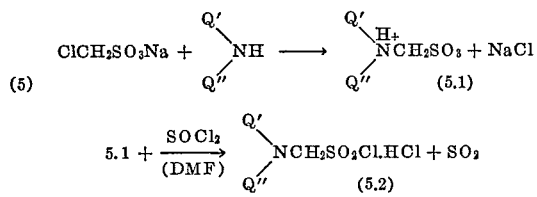

where $Q'$ and $Q''$ have their above given definitions.

The sodium chloromethanesulfonate ($ClCH_2SONa$) is conveniently prepared by the method of T. L. Smith and J. H. Elliott, Journal of American Chemical Society 75 3566 (1963) from methylene chloride and sodium sulfite. This is reacted with the amine $Q'Q''NH$ in a common solvent for both reactants and which additionally is preferably substantially unreactive towards either component but in which NaCl is preferably substantially insoluble. Such solvent should preferably also be a liquid in which Formula 5.1 compounds are soluble. Suitable solvents include lower alcohols, such as methanol, and ethanol; lower ketones, such as acetone and methyl ethyl ketone; and amides, such as dimethyl formamide and dimethylacetamide; and the like. Reaction temperatures between 50 to 100° C. are preferred. At the end of the reaction, the separated NaCl is removed, and the product may be isolated by crystallization from a cooled (e.g. 25° C. or colder) solution or by adding to the mixture a non-solvent inert liquid such as a hydrocarbon or an ether.

The sulfonyl chloride of Formula 5.2 is prepared in the same manner as above described for the sulfonyl chloride of Formula 2.2. Yields of these aminosulfonyl chlorides when $n$ is 1 are typically 60 to 90 percent of theory.

It will be appreciated that the compounds of Formula 1 are, owing to the above-indicated method of preparation, usually obtained as the hydrohalide salts, since such salts are preferred for use in the electrochemical cell.

The compounds of Formula 1 not only are useful intermediates for the manufacture of the perfluorinated products of this invention, but also they are useful intermediates for the production of pharmaceuticals and wetting agents.

When the compounds of Formula 1 are used as starting materials in the general electrochemical process described above, they may be initially present in the electrolytic solution of hydrogen fluoride in an amount ranging from about 1 to 20 percent by weight. Both the organic starting material and the conventional hydrogen fluoride electrolyte are replenished from time to time as consumed during fluorination. The exit gas mixture is passed through a refrigerated condenser to condense out most of the hydrogen fluoride vapors that are evolved and the liquefied hydrogen fluoride is then drained back into the cell for reuse.

After being subjected to electrofluorination in accordance with the teachings of this invention, the corresponding alpha, beta, gamma or delta nitrogen substituted perfluorinated sulfonic acid fluorides are produced. The perfluorinated sulfonic acid fluorides produced from the starting compounds of Formula 1 have the general formula:

(6)

where: $n$ is an integer from 1 through 4; $Q_3$ can be perfluoroalkyl radicals of less than 9 carbon atoms, perfluorocycloalkyl radicals of less than 9 carbon atoms, lower perfluoroalkylcycloalkyl radicals of less than 9 carbon atoms, alkylenesulfonyl fluoride radicals of less than 5 carbon atoms, and a perfluoroethylene carbonyl fluoride; $Q_4$ can be perfluoroalkyl radicals of less than 19 carbon atoms, perfluorocycloalkyl radicals of less than 9 carbon atoms, lower perfluoroalkylenesulfonyl fluoride radicals of less than 5 carbon atoms; and $Q_3$ and $Q_4$ together are a divalent radical such as a perfluoroalkylene diradical of 4 through 7 carbon atoms, a perfluoroalkylene oxide diradical of 4 through 6 carbon atoms, a perfluoroalkylene sulfur tetrafluoride diradical of 4 through 6 carbon atoms, a perfluoroalkylenesulfone diradical of 4 through 6 carbon atoms, perfluorodiethylene gamma amino perfluoroalkylenesulfonyl fluoride diradicals and perfluoro beta-(N,N-diethyleneamino) propionyl fluoride diradical.

Preferred compounds of Formula 6 are those wherein $Q_3$ and $Q_4$ are each the same or different lower perfluoroalkyl radical (i.e. one containing less than 5 carbon atoms), and $Q_3$ and $Q_4$ together with the nitrogen atom shown in Formula 6 contain a piperidene, morpholine or piperazine ring structure.

The perfluorinated sulfonic acid fluorides of Formula 6 (above) can be converted to the corresponding perfluorinated sulfonic acids by simple hydrolysis using conventional methods well known to those of ordinary skill in the art (see the examples below). Also, from the corresponding acids, the esters, alkali metal, and ammonium salts are similarly readily prepared.

The fluorinated products are insoluble in liquid hydrogen fluoride and either settle to the bottom of the cell or evolve with the hydrogen fluoride and other gaseous products, depending upon the volatility, and are readily recovered by refrigeration and condensation.

The perfluorinated alpha, beta, gamma and delta nitrogen substituted sulfonic acid fluorides and their derivatives of this invention are useful for a number of purposes. Thus, by treatment of the acid fluorides with aqueous alkali metal hydroxides, the corresponding alkali metal salts are obtained. These alkali metal salts are useful as surfactants and as emulsifiers in polymerization systems. By substitution of aqueous ammonium hydroxide, the ammonium salts having similar uses to the metal salts are obtained. Valuable cationic surface active agents based on the perfluorinated sulfonic acids of this invention are prepared using the methods described in U.S. Patents Nos. 2,750,334 and 2,750,337.

The sulfonyl fluorides of this invention are useful as components in the manufacture of aromatic esters by reaction with various phenols.

For example, the sulfonyl fluoride and a phenol can be reacted in equimolar quantities in a solution of a strong tertiary base such as triethyl amine at elevated temperatures, say 50 to 80° C. The following equation is illustrative:

(7)

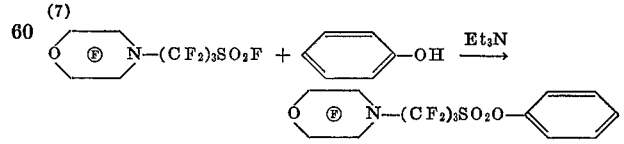

As used in this specification, the symbol ⒫ indicates a perfluorinated ring. These aryl esters of the fluorocarbon sulfonic acids of this invention are useful as lubricants, lubricant additives, dielectric media, and the like.

The difunctional sulfonyl fluorides of this invention are useful as monomers for reaction with difunctional phenols to make poly sulfonates by heating substantially equimolar quantities of each comonomer in a solution of a strong tertiary base such as triethyl amine, or the like, at elevated temperatures typically ranging from 50 to 80°

C. For example, the reaction with bisphenol A proceeds as follows:

(8)
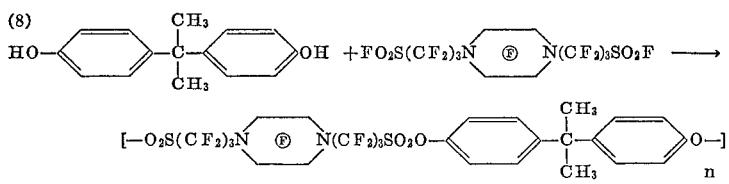

The sulfonyl fluorides of this invention are also useful in the manufacture of sulfonamides by reacting the sulfonyl fluorides with amines. Sulfonamides are useful as pharmaceuticals, dyestuff intermediates, and the like. For example, the N-ethyl sulfonamide can be prepared as follows:

(8.1)
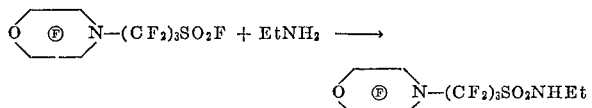

These amides are conveniently prepared as per the teachings of U.S. Patent No. 2,803,656.

Polysulfonamides are readily prepared by reaction of the disulfonyl fluorides with diamines.

The perfluorinated morpholine sulfonic acids and the corresponding salts as defined below in Formula 8.2 of this invention find unexpectedly satisfactory utility in chromium plating baths especially those of the self regulating type. Those familiar with the art of electroplating chromium from chromic acid type solutions will appreciate that it has heretofore been appreciated that saturated fluorocarbon sulfonic compounds have been found to be useful in standard chromium plating baths as surface tension depressants and foaming agents to reduce or eliminate mist evolution; see, for example, U.S. Patents Nos. 2,750,334 and 2,750,336. However, such prior art fluorocarbon sulfonic acid and corresponding salt compounds have been found to be inadequate for use in the so-called self-regulating chromium plating baths where improvements in current efficiency, speed of deposition, and other characteristics of chromium plating are achieved by the use of the proper proportions of both sulfate and fluosilicate catalysts added to the chromic acid plating bath.

A typical self-regulating bath can consist of a solution containing dissolved therein the following materials:

| | Grams/liter |
|---|---|
| $CrO_3$ | 248 |
| $H_2SO_4$ | 1.88 |
| $Na_2SiF_6$ | 11.2 |

It will be appreciated by those skilled in the art that, in such self-regulating baths, the amount of dissolved fluosilicate is controlled by exploiting the common ion effect and by using a fluosilicate salt having an optimum predetermined limited solubility. The result is that concentrations of both sulfate and fluosilicate ions in a self-regulating chromium plating bath are suppressed and controlled to proportions desired.

When a perfluorinated acid or corresponding salt material of the formula (8.2)
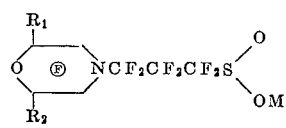

where M is a cation, including hydrogen, ammonium, alkali metal (such as magnesium and calcium) and zinc; and $R_1$ and $R_2$ can be the same or different and each is fluorine or a lower perfluoroalkyl radical, is incorporated into a self-regulating chromium plating bath, it is found that such compounds are excellent surfactants, promote good foam formation and provide mist suppression.

Although the quantity of such compound of Formula 1 used in such a self-regulating bath can vary, it is preferred to employ at least about 0.01 gram per liter of such compound in a typical self-regulating bath, for example, one employing lead alloy anodes and operating at temperatures of 115 to 130° F. with temperatures of about 120° F. being preferred.

The following di-N-substituted amino alkylene sulfonic acid halides shown in Table I are useful for the production of the corresponding perfluorinated sulfonyl fluorides.

Yields generally range up to about 35 weight percent based on organic raw materials used. Procedures and conditions for fluorination can be generally as described below in Example 1. It will be appreciated that, in the process of practicing the processes of the present invention, one inherently obtains as the product a mixture of perfluorinated isomers. This mixture is then processed as by distillation to recover a desired perfluorinated product.

TABLE I

| Sulfonyl Halide | Product |
|---|---|
| $(CH_3)_2NCH_2SO_2Cl$ | $(CF_3)_2NCF_2SO_2F$ |
| ⌬$N(CH_2)_3SO_2F$ | ⌬ⓕ$N(CF_2)_3SO_2F$ |
| $C_8H_{17}\overset{CH_3}{\underset{|}{N}}(CH_2)_3SO_2Cl$ | $C_8F_{17}\overset{CF_3}{\underset{|}{N}}(CF_2)_3SO_2F$ |
| $C_6H_5CH_2\overset{CH_3}{\underset{|}{N}}(CH_2)_2SO_2Cl$ | $c\text{-}C_6F_{11}CF_2\overset{CF_3}{\underset{|}{N}}(CF_2)_2SO_2F$ |
| $p\text{-}CH_3C_6H_4\overset{C_2H_5}{\underset{|}{N}}(CH_2)_3SO_2Cl$ | $CF_3C_6F_{10}\overset{C_2F_5}{\underset{|}{N}}(CF_2)_3SO_2F$ |
| $C_2H_5$⌬$N(CH_2)_4SO_2Cl$ | $C_2F_5$⌬ⓕ$N(CF_2)_4SO_2F$ |
| $C_6H_5\overset{C_2H_5}{\underset{|}{N}}CH_2SO_2Cl$ | $c\text{-}C_6F_{11}\overset{C_2F_5}{\underset{|}{N}}\!-\!CF_2SO_2F$ |

TABLE I—Continued

| Sulfonyl Halide | Product |
|---|---|
| ClO₂S(CH₂)₃N(C₂H₅)—(CH₂)₃SO₂Cl | C₂F₅N[(CF₂)₃SO₂F]₂ |
| ClOC(CH₂)₂N(C₂H₅)—(CH₂)₃SO₂Cl | FOC(CF₂)₂N(C₂F₅)(CF₂)₃SO₂F |
| C₁₈H₃₇N(C₂H₅)—(CH₂)₂SO₂Cl | C₁₈F₃₇N(C₂F₅)—(CF₂)₂SO₂F |
| c-C₆H₁₅N(C₂H₅)(CH₂)₃SO₂Br | c-C₆F₁₅N(C₂F₅)(CF₂)₃SO₂F |
| C₂H₅—⬡—N(C₂H₅)—CH₂SO₂F | C₂F₅—⬡—N(C₂F₅)—CF₂SO₂F |
| C₆H₅CH₂CH₂N(CH₃)(CH₂)₄SO₂Cl | c-C₆F₁₁CF₂CF₂N(CF₃)(CF₂)₄SO₂F |
| [ClSO₂(CH₂)₄]₂NC₂H₅ | C₂F₅N[(CF₂)₄SO₂F]₂ |
| c-(CH₂)₇NCH₂CH₂SO₂Br | c-(CF₂)₇N(CF₂)₂SO₂F |
| S⬡N(CH₂)₃SO₂Cl | F₄S⬡N(CF₂)₃SO₂F |
| S(CH₂)₃(CH₂)₃N(CH₂)₂SO₂Cl | F₄S(CF₂)₃(CF₂)₃N(CF₂)₂SO₂F |
| O₂S⬡N(CH₂)₂SO₂F | O₂S(CF₂CF₂)(CF₂CF₂)N(CF₂)₂SO₂F |
| O₂S(CH₂)₃(CH₂)₃N(CH₂)₂SO₂F | O₂S(CF₂)₃(CF₂)₃N(CF₂)₂SO₂F |
| ClO₂S(CH₂)₃N⬡N(CH₂)₃SO₂Cl | FO₂S(CF₂)₃N⬡N(CF₂)₃SO₂F |
| ClOC(CH₂)₂N⬡N(CH₂)₃SO₂Cl | FOC(CF₂)₂N⬡N(CF₂)₃SO₂F |
| c-C₆H₁₅N(C₂H₅)(CH₂)₃SO₂Cl | c-C₆F₁₅N(C₂F₅)(CF₂)₃SO₂F |
| ▢—N(C₂H₅)(CH₂)₃SO₂Cl | ⓕ—N(C₂F₅)(CF₂)₃SO₂Cl |
| ClOC(CH₂)₂N(C₂H₅)(CH₂)₃SO₂Cl | FOC(CF₂)₂N(C₂F₅)(CF₂)₃SO₂F |
| O(CH₂)₃(CH₂)₃N(CH₂)₃SO₂Cl | O(CF₂)₃(CF₂)₃N(CF₂)₃SO₂F |

The following examples are offered as a better understanding of the present invention and should not be construed as unnecessarily limiting thereto.

EXAMPLE 1

Preparation of perfluoro [(N-morpholino) gamma propane sulfonyl fluoride]

To 871 grams of morpholine dissolved in 2300 milliliters of isopropanol is added 1220 grams of 1,3-propane sultone. The temperature of the reaction is kept below 50° C. by means of external cooling. The reaction mixture is stirred for three hours after the addition, cooled to room temperature, and suction filtered to obtain solid sulfonic acid. Dried yield is 2020 grams.

The acid is converted to the sulfonyl chloride hydrochloride by mixing 1020 grams of the acid above with 1500 milliters of thionyl chloride containing 30 milliliters dimethylformamide and refluxing for five and one-half hours. The excess thionyl chloride is removed by vacuum distillation. The resulting solids are slurred with 2000 milliliters of isopropyl ether and suction filtered and dried. The sulfonyl chloride is further purified by reslurrying with acetonitrile, filtering and drying at 100° C. Yield of N-morpholino gamma propane sulfonyl chloride hydrochloride, Formula 8.3, is 950 grams.

(8.3)  O⬡N(CH₂)₃SO₂Cl·HCl

Electrochemical fluorination of this compound is carried out by initially charging 100 grams of Formula (8.3) in 2000 grams of anhydrous liquid hydrogen fluoride to a 40-ampere cell of the type described above. The starting compound dissolved in the liquid HF and provided adequate conductivity. The cell is operated at atmospheric pressure and a temperautre of about 20° C. The average current is approximately 40 amperes and the voltage is in the range of 5 to 6 volts, the average anode current density being approximately 20 amperes per sq. ft. A solution of Formula 8.3 in hydrogen fluoride and anhydrous fluoride is added to the cell at intervals to maintain the liquid level in the cell and the initial concentration of about 5% Formula 8.3. A total of 2084 grams of liquid fluorinated cell product is recovered from 1766 grams starting material. Analysis of the fluorinated product by gas liquid chromatography indiactes the presence of 65.6 percent perfluoro [(N-morpholino) gamma propane sulfonyl fluoride ] of the Formula 8.4.

(8.4) 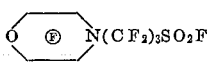

From fractional distillation of 300 grams of cell product there is obtained 181 grams of Formula 8.4 boiling point 148°–149° C. The corresponding potassium salt (8.5) 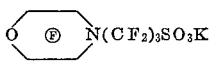

named potassium perfluoro [(N-morpholino) gamma propane] sulfonate is obtained by direct hydrolysis of Formula 8.4 with an equal weight of 50% aqueous KOH at reflux.

This salt is also obtained from the total cell products in the following manner: Three hundred grams of cell product is combined with 315 grams water and 375 grams $K_2CO_3$.

The mixture is refluxed for a total of 16 hours. The inert fluorocarbons present are then steam distilled from the salt mixture until foaming prevents further distillation. The mixture is finally cooled to 20° C. and the insoluble potassium sulfonate removed by filtration. Reslurrying the salt in 300 milliliters of 70° C. water, followed by chilling, filtration, water washing the filtration cake, and drying at 120° C. gives 268 grams of the crude salt.

Other salts may be obtained in a like manner using either the metal carbonates or hydroxides.

The potassium sulfonate of Formula 8.4 is used to prepare the corresponding acid, perfluoro [(N-morpholino) gamma propane] sulfonic acid of Formula 8.5

(8.5) 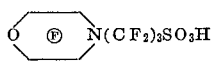

in about 70 percent yield by distillation of the salt from excess 100 percent $H_2SO_4$. The acid is a white solid having a boiling point of about 242° C. It is moderately soluble in water, methanol and ether, but is only slightly soluble in hydrocarbons and fluorocarbons.

The surface activity of the acid and its salts is demonstrated by the reduction in surface tension of 10 percent aqueous NaOH solution to 21.4 dynes by the addition of 0.01 percent by weight of Formula 8.5. The addition of 0.01 percent by weight of Formula 8.4 to 10 percent aqueous $H_2SO_4$, producing an equilibrium of Formula 8.4 and Formula 8.5, reduces the surface tension to 33.6 dynes.

The surface tension of an aqueous 25 percent chromic acid solution is reduced to 18.5 dynes at a concentration of 1.2 grams of Formula 8.4 per liter, and 29.7 dynes at 0.12 gram of Formula 8.4 per liter.

EXAMPLE 2

Preparation of perfluoro N-(2,6-dimethylmorpholino) gamma propanesulfonyl fluoride In a 3-liter round bottom flask fitted with a stirrer, condenser and thermometer is placed 305 grams (2.50 moles) of 1,3-propanesultone dissolved in 1500 milliliters of dry acetone. With stirring, 287.5 grams (2.50 moles) of 2,6-dimethylmorpholine is added. The reaction temperature rises to 45° C., and is cooled to 30° C. with an ice bath, then is allowed to rise to 50° C. over a ½ hour period. Crystals soon appear. The reaction is stirred 3 hours, cooled to 25° C. and filtered. The filter cake is washed with 500 milliliters of acetone, then dried under reduced pressure to yield 540 grams (91 percent) of N-(2,6-dimethylmorpholino) gamma propanesulfonic acid which has a melting point of 285 to 290° C.

In a 3-liter round bottom flask fitted with a stirrer, condenser, heating mantle, thermometer and gas exit bubbler is placed 1,000 milliliters of thionyl chloride and 500 grams of N-(2,6-dimethylmorpholino) gammapropanesulfonic acid. To this is added 10 milliliters of dimethylformamide. The reaction is brought to reflux and stirred 2 hours until $SO_2$ gas evolution subsides. Then the reaction mixture is cooled and 300 grams of N-(2,6-dimethylmorpholino) gammapropanesulfonic acid and 10 milliliters of dimethylformamide is added, and the reaction is brought to reflux for 2 more hours until gas evolution subsides. Excess thionyl chloride is distilled off under reduced pressure. The residue is a viscous oil which tends to crystallize. Isopropyl ether (500 milliliters) and acetonitrile (50 milliliters) is added and the product crystallizes when stirred. The product is isolated by filtration and the filter cake is washed with 300 milliliters of 70:30 i-propyl ether:acetonitrile, then with ether, then dried to yield 799 grams (81 percent) of N-(2,6-dimethylmorpholino) gamma propanesulfonyl chloride hydrochloride which has a melting point of 153–155° C.

A solution of 258 grams (0.89 mole) of Formula 9

(9) 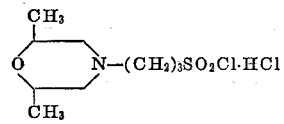

is dissolved in anhydrous hydrogen fluoride to make a solution 50 percent by weight of solids which is used as the organic feed for the cell. This organic feed is charged to the cell in such a manner as to maintain the non-hydrogen fluoride concentration of preferably 3 to 6 percent during the fluorination.

The production rate of drainings is 20.3 grams per 50 ampere hours. A total crude product isolated from the cell is 260 grams of fluorochemicals, of which 51 percent is a mixture of perfluoroaminosulfonyl fluorides mainly of the Formula 10

(10) 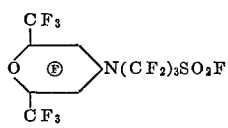

which is the compound perfluoro [N-(2,6-dimethyl morpholino) gamma propanesulfonyl fluoride] and $(CF_3CF_2CF_2)_2N(CF_2)_3SO_2F$ perfluoro [N-N-dipropylamino gamma propanesulfonyl fluoride] as well as minor amount of other undetermined sulfonyl fluorides. This mixture has a boiling point of 77–87° C. at 22 mm. Hg pressure.

EXAMPLE 3

Preparation of perfluoro N,N'-bis(3-fluorosulfonyl propyl) piperazine

The disulfonyl chloride, N,N'-bis(3-chlorosulfonyl propyl) piperazine dihydrochloride is synthesized

(11) 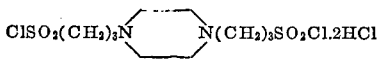

by procedures similar to those above in Example 1.

Electrochemical fluorination of this compound is carried out by charging Formula 7 as a 50 percent solution in hydrogen fluoride. The charging rate is adjusted so that the non-hydrogen fluoride concentration in the cell is preferably 3 to 6 percent. The steady state production rate of drainings is 13 grams per 50 ampere-hours. From these drainings, could be isolated the perfluorodisulfonyl fluoride,

(12) 

as 28 percent of these products, or a production rate of 3.6 grams per 50 ampere-hours. Formula 12 has a boiling point of 80–88° C. at 0.3 mm. Hg pressure, and a melting point of 43 to 46° C. In addition, a mixture of perfluoromonosulfonylfluorides of boiling point 42–80° C. at 0.3 mm. Hg pressure can be isolated. The production rate is 3.0 grams per 50 ampere-hours for this mixture.

EXAMPLE 4

The compound gamma piperidinopropane sulfonyl chloride hydrochloride which has the formula

(13) 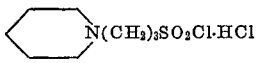 $N(CH_2)_3SO_2Cl \cdot HCl$ is made by procedures similar to those described in Example 1. This cell raw material is charged to a cell as a 55 percent solution in hydrogen fluoride, at such a rate as to maintain the non-hydrogen fluoride concentration at 3 to 6 percent during the cell run.

The average production rate of drainings from the cell is 15.3 grams per 50 ampere-hours. From the drainings is isolated, by careful distillation, perfluoro [N-(piperidino) propane sulfonyl fluoride] which has the formula

(14) 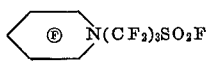 $\bar{N}(CF_2)_3SO_2F$ and smaller amounts of isometric sulfonyl fluorides which boil at 56–60° C., at 18 mm. Hg pressure and has an index of refraction ($n_D^{25}$) of 1.3135. The production rate of the compound of Formula 14 is 5.1 grams per 50 ampere-hours of cell operation.

The claims are:
1. A compound of the formula

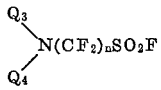

where $n$ is an integer from 1 through 4; $Q_3$ is selected from the group consisting of a perfluoroalkyl radical of less than 9 carbon atoms, a perfluorocycloalkyl radical of less than 9 carbon atoms, a lower perfluoroalkylcycloalkyl radical of less than 9 carbon atoms, a fluosulfonyl perfluoroalkyl radical of less than 5 carbon atoms, and a fluocarbonyl perfluoroethyl radical; $Q_4$ is selected from the group consisting of a perfluoroalkyl radical of less than 19 carbon atoms, a perfluorocycloalkyl radical of less than 9 carbon atoms, a fluosulfonyl lower perfluoroalkyl radical of less than 5 carbon atoms; and $Q_3$ and $Q_4$ taken together with the depicted nitrogen atom form a perfluoroheterocyclic ring.

2. A compound of the formula

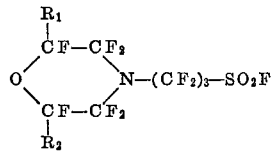

wherein $R_1$ and $R_2$ are the same or different radicals selected from the class consisting of fluorine and a lower perfluoroalkyl radical of less than 5 carbon atoms.

3. Perfluoro[N - gamma fluosulfonylpropyl, 2,6 - dimethyl morpholine].
4. Perfluoro[N,N' - bis(3 - fluosulfonylpropyl)piperazine].
5. Perfluoro[N - (gamma fluosulfonylpropyl)piperidine].
6. Perfluoro[N -( gamma fluosulfonylpropyl)morpholine].

References Cited
UNITED STATES PATENTS

| | | | |
|---|---|---|---|
| 2,433,997 | 1/1948 | Linch | 260—543 |
| 2,500,388 | 3/1950 | Simons | 260—614 |
| 2,519,983 | 8/1950 | Simons | 204—62 |
| 2,616,927 | 11/1952 | Kauck et al. | 260—563 |
| 2,888,486 | 5/1959 | Gregory | 260—543 |
| 2,950,317 | 8/1960 | Brown et al. | 260—543 |

OTHER REFERENCES

Allen et al.: Chemical Abstracts, vol. 62, page 13824, (1965).

ALEX MAZEL, Primary Examiner

J. TOVAR, Assistant Examiner

U.S. Cl. X.R.

204—51; 252—47.5, 63.7, 355; 260—243, 268, 293.4, 327, 333, 543

UNITED STATES PATENT OFFICE
CERTIFICATE OF CORRECTION

Patent No. 3,476,753                                  November 4, 1969

Robert L. Hansen

It is certified that error appears in the above identified patent and that said Letters Patent are hereby corrected as shown below:

Column 5, line 22, "(1963)" should read -- (1953) --. Column 9, Table I, sixth formula should appear as shown below:

$C_6H_5CH_2CH_2N(CH_3)(CH_2)_4SO_2Cl$

Column 10, Table I, last formula should appear as shown below:

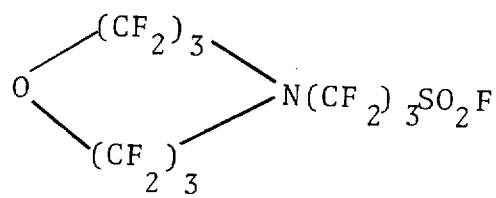

same column 10, line 69, after "anhydrous" insert -- hydrogen --. Column 13, line 19, "isometric" should read -- isomeric --.

Signed and sealed this 19th day of May 1970.

(SEAL)
Attest:

EDWARD M. FLETCHER, JR.
Attesting Officer

WILLIAM E. SCHUYLER, JR
                                                     Commissioner of Patents